Figure 1:
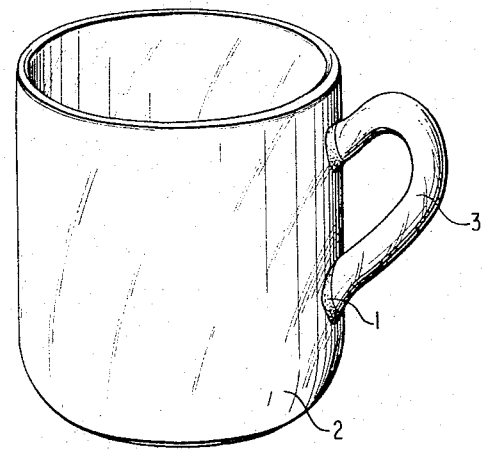

Jan. 10, 1967     L. J. WELLS     3,297,186
TRANSPARENT GLASS CONTAINER AND METHOD OF MAKING SAME
Filed July 24, 1962

ADHESIVE COMPOSITION OF EPOXY RESIN AND GAMMA-AMINOPROPYLTRIETHOXY SILANE

INVENTOR
LOWELL J. WELLS

BY W. A. Schaich + C. S. Lynch
ATTORNEY 3,297,186
TRANSPARENT GLASS CONTAINER AND
METHOD OF MAKING SAME
Lowell J. Wells, Toledo, Ohio, assignor to Owens-Illinois,
Inc., a corporation of Ohio
Filed July 24, 1962, Ser. No. 212,141
16 Claims. (Cl. 215—100)

This invention broadly relates to a method of permanently sealing glass surfaces together and more particularly to a method of sealing glass handles and/or stems onto glass containers such as tumblers, mugs, cups, goblets, pitchers and the like.

Heretofore, glass containers have had handles either molded on as an integral part of the original container or have had the handles heat-sealed into place by melting the end surface of the handle and the corresponding exterior surface of the container and then cooling the molten contacting surfaces to form the seal. The former has as major disadvantage the need for special molds, which molds cannot be used for the production of ware without integral handles. The latter also has its disadvantages, particularly with sham-bottomed ware, which develops areas of unequal stress due to the localized heating and cooling. This results in a weekend bond when the ware is later subjected to thermal shock.

While it has long been recognized that ware may be made independently of the handles and/or stems and such handles and stems may subsequently be secured to the finished ware, no commercially suitable means for successfully adhering such handles or stems has been developed in the art. As will be appreciated, the bond between the handle or stem and the exterior surface of the glass container must be able to withstand normal usage and wear, which includes withstanding thermal shock such as occurs when either cold or hot liquids are poured into the container or when the containers are washed or rinsed in hot water, such as in a dishwashing machine.

Further, the bond between the sealed members must remain at maximum strength during the life of the ware and must not, as has been the case in the prior art, weaken with use and with repeated washing of the ware.

Many sealing adhesives have been utilized or suggested by the prior art but without success in this particular field. Epoxy resin adhesives have been used as the sealant for the handles but after repeated washing of the ware, the bond is gradually weakened so as to constitute a hazard to the user. One can never be sure, for instance, that the handle will not become detached at the precise moment he picks up the glass container to drink the coffee, tea or other hot liquid therein, thus risking the possibility of being scalded or, at the very least having his clothes splattered with the hot liquid and perhaps with broken glass.

A prime requisite for a glass seal for a transparent glass container and handle is for the seal to also be transparent so as to give the appearance of the handle being integral with the container. Another requisite for a strong permanent seal is for the cured seal to be free of all bubbles since the presence of such bubbles both detracts from the appearance of the ware and presents points of weakness in the seal.

Still another requisite of the adhesive composition which forms the seal is its ability to fill the voids present between the surface end or ends of the handle and the adjoining exterior surface or surfaces of the container and to maintain the voids in a filled condition while heat is being applied to the joint to cure the adhesive and perfect the seal. It has been found that many adhesives begin to flow upon the application of heat so that the finished product contains voids about the peripheral edge of the joint, making the ware commercially unacceptable.

Accordingly, it is an object of the present invention to obviate the above disadvantages present in sealing glass surfaces together.

Another object of this invention is to provide a method for permanently securing a glass handle or stem to a glass container wherein the formed joint is free of voids about is peripheral edge.

A further object of this invention is to provide a method for permanently securing a transparent glass handle or stem to the outer surface of a transparent glass container by means of a transparent bubble free seal whereby the glass container gives the appearance of the handle or stem being integral therewith.

Still another object of this invention is to provide a process whereby glass handles and/or stems may be quickly and readily permanently attached to a glass container, and the containers packaged within a matter of minutes, ready for shipment to customers.

Still another object of this invention is to provide a glass container having a glass handle and/or stem permanently secured thereto, which container is capable of withstanding a number of washings without any weakening of the bond between the attached members.

A further object of this invention is to provide a transparent glass container having a transparent glass handle and/or stem permanently secured thereto by a transparent bubble-free resin sealing composition, with the handle and/or stem having the appearance of being an integral part of the container, and the joint being free of voids about its peripheral edge.

In obtaining the objects of this invention, one feature resides in the use of an adhesive composition consisting essentially of a major proportion of an epoxy resin, a curing agent in an amount sufficient to cure the epoxy resin and a minor amount of an amino-substituted alkylalkoxy silane.

Another feature resides in maintaining the adhesive composition free of water and other solvents so as to provide a bubble-free transparent seal between the two joined members.

Other objects, features and advantages will become more apparent from the following discussion of the invention taken in conjunction with the accompanying drawing.

Figure 2:
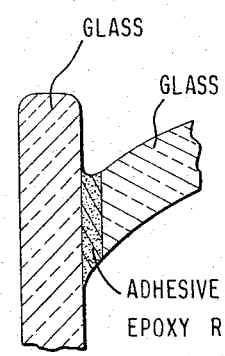
Figure 3:
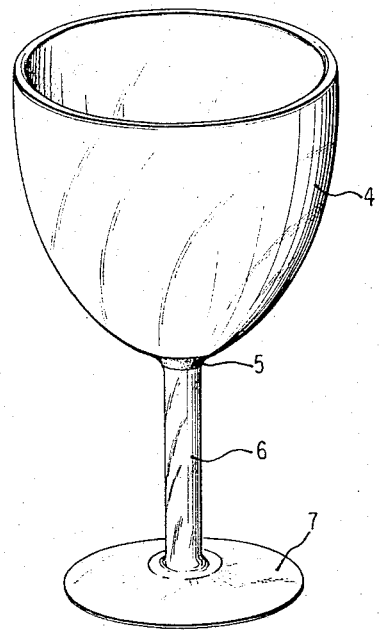

FIG. 1 is a side view of an embodiment of the invention illustrating a handle secured to a cup, FIG. 2 is a cross-sectional view of a portion of the cup and the handle illustrated in FIG. 1; and FIG. 3 is a side view of another embodiment of the invention illustrating a glass stem sealed to the bottom surface of a glass.

As illustrated in FIG. 1, the glass cup 1 has the handle 3 attached to its outer surface by means of the seal of the invention. In FIG. 3, a glass body 4 is sealed to a glass stem 6 and base 7 by means of a seal 5.

The epoxy resin which is utilized for purposes of the invention is a liquid resin and preferably one possessing terminal epoxide groups and having a structure as follows:

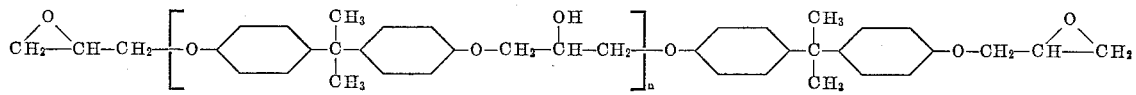

The value of $n$ is that which is sufficient to maintain the resin as a liquid. Epoxy-type resins coming within the above formulation include those manufactured and sold by Shell Chemical Company under the trademark Epon 815, Epon 820, Epon 826, Epon 828, Epon 830, and the like, where the identifying number increases as the molecular weight increases. The polymer of the above formula is produced by the condensation of epichlorohydrin with 2,2-bis (4-hydroxy phenyl) propane.

An epoxy resin is usually defined as any molecule containing more than one epoxy group and the groups may be glycidyl, terminal, internal, ring situated, etc. or combinations of any of these, which resin is capable of curing or reacting to a hard, tough, durable solid. Rather than list all of the above, well-known types of epoxy resins, reference will be made to the discussion of the epoxy-resins as described in the six part article, "New Developments in Epoxy Resins," by Henry Lee and Kris Neville, in the periodical, "Insulation," Lake Publishing Corporation, Libertyville, Illinois, 1960–1961, which discussion is incorporated herein by reference.

As used in the present application, the term "epoxy resin" is not to be considered limiting in any manner and is to be considered inclusive of all known liquid epoxy resins which can be used without solvents since no reason is known at this time why any such epoxy resin should not be operable for the purpose of the invention.

For purposes of the present invention, the epoxy resin should be a liquid and should not contain any solvents admixed therewith. Curing agents for the epoxy resins are also well-known and these are of two types, i.e. catalyst and cross-linking. The catalyst curing agent causes one epoxy resin molecule to react directly with another epoxy resin molecule and the reaction proceeds rapidly until the epoxy groups are consumed. The crosslinking agents, on the other hand, react with the epoxy molecules and are coupled directly into the cured system as structural members of the molecular network.

Included among the curing agents for the solventless, liquid epoxy resins of the invention are diethylene triamine, triethylene tetramine, tetraethylene pentamine, diethylamino propylamine, methylene dianiline, phthalic anhydride, dodecylsuccinic anhydride, metaphenylene diamine, dicyandiamide, and the like.

Other curing agents suitable for the purposes of the invention are disclosed in the aforesaid article "New Developments in Epoxy Resins." While the catalyst type of curing agents are usually present in an amount of from about 1 to about 10 parts by weight of the epoxy resin, the crosslinking agents may be present in amounts of about 5 to 50 parts by weight or more, although 10–30 parts is preferred, and the property of the cured system will be influenced by the specific crosslinking agent employed. The amount of curing agent to be used will vary with the different agents and this amount can be readily ascertained. Accelerators, plasticizers, colorants and other additives known to the art may be incorporated into the epoxy-resin-curing agent composition to perform their particular functions.

It has been found that a bubble-free, transparent, durable seal having the outward appearance of a polished glass is obtained when the epoxy resin-curing agent composition contains an amount of amino-silane sufficient to make the seal impervious to attack by water. Usually from about 1 to about 2.5% by weight of silane is sufficient to give the desired results. The resulting bond between the glass surfaces is resistant to moisture and repeated washings and when a force is applied to the glass to separate the joined glass surfaces, the seal or bond is maintained and breakage occurs on the glass rather than at the seal.

The amino silane of the present invention may be described as an amino-substittued alkyl alkoxy silane wherein all four valences of the Si atom have one or two amino substituted alkyls, and three or two alkoxy groups, and, if desired, an alkyl group. The silane may be illustrated by the formula

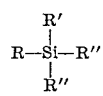

wherein R is an amino-substituted alkyl, R' is a member selected from the group consisting of alkyl, amino-substituted alkyl, and an alkoxy group and R'' is an alkoxy group.

Good results are obtained when the amino group is separated from the Si atom by at least three carbon atoms, such as when the alkyl group containing the amino radical is propyl or butyl. It is preferred to have the alkoxy group and the alkyl group be lower alkoxy and lower alkyl, i.e. 1 to 8 carbon atoms.

Compounds coming within the scope of the above formula include gamma-aminopropyltriethoxy silane and delta-aminobutylmethyldiethoxy silane.

Comparative tests were conducted to show the effectiveness and superiority of the adhesive composition of the invention over a composition which did not contain the amino silane.

*Example I*

One part by weight diethylene triamine was added to 12½ parts by weight of Epon 828, having a molecular weight of about 400, and the composition was thoroughly stirred. A small drop of the mixture was then placed on the end of a transparent glass handle and a second drop was placed on the exterior of the transparent glass container to which the handle was then secured. Four containers, held in place in a jig, had handles applied thereto in this manner and the containers were air-cured for one hour and then subjected to an infra-red lamp (placed 1½ inches from the seal) for two minutes. The jig was then placed in a room for 3 days where the temperature was maintained at 122° F.

Two of the containers were then tested on an Instron Testing Machine to ascertain whether the seal or the glass would break when a force was applied to the handle in an attempt to separate the handle from the container. In each instance the handle broke at a point spaced from the sealed area.

The remaining two containers were soaked for one week in water at room temperature (76° F.), and then tested in a like manner in the Instron Testing Machine. This time the seal failed in both instances and the handles were separated from the containers at the seal joints.

When the epoxy resin mixture contained 2% by weight of gamma-aminopropyltriethoxy silane, based on the epoxy resin, there was no failure of the seal after immersion in water.

*Example II*

A second group of transparent glass tumblers in a jig had transparent glass handles secured thereto by the following adhesive composition:

| | Gms. |
|---|---|
| Epon 828 | 100 |
| Gamma-aminopropyltriethoxy silane | 2.4 |
| Curing Agent (Shell U) | 20.0 |

The curing agent was a mixture of 52 parts Epon 828, 46 parts of diethylene triamine and 2 parts phenol as an accelerator.

The handles were held in place on the container and infra-red heat from a Fannon gas heater placed 1½ inches from the affixed parts for two minutes cured the epoxy resin adhesive composition without discoloring or otherwise marring the transparency of the sealed area.

The tumblers were then cycled 32 times in a dishwasher wherein the hot water was at a temperature of from 138° F. to 146° F. After each cycle the tumblers were removed, filled with cold water, picked up by the handle and returned for another cycle.

The tumblers were then placed in the Instron Testing Machine and an attempt was made to pull off each handle. In no instance was there any failure of the epoxy-resin seal at the juncture of the handle and the container.

Similar excellent results were obtained when the silane was applied separately to either the container or the handle end, dried and then the epoxy resin-curing agent composition was applied to the primed surface and cured, bonding the glass components together.

In attaching the handles, stems, and the like to the glass surfaces using the adhesive composition of the invention, a sufficient amount of the adhesive is used to form a continuous surface between the periphery of the handle end and the container surface. When cured, the adhesive has the same outward appearance as the glass which it bonds and the glass appears to be an integral unit instead of two separate units.

Having no voids about the periphery of the handle end adjacent the container is quite important since the end surface of the handle is rarely of the same curvature as the exterior surface of the container (it is usually flat), unless the handle is ground to this curvature which increases the cost per finished container. Thus, even though there is no matching of the container surface and handle end, the drop of thixotropic adhesive is of an amount sufficient to fill the space between the handle end and the container surface so that the finished product has no voids about the periphery of the handle end adjacent the container. The adhesive, when applied as a drop, resembles a globule and remains as such until it is pressed outwardly by the handle end to cover the entire space between the glass surfaces. The glass areas to be sealed are usually from one-half to three-quarters of an inch square, although good seals have been obtained with larger and smaller areas. The thickness of the adhesive composition when the handle is affixed to the container is less than one-half of a mil, and it is surprising that such a thin film is sufficient to render the affixed parts moisture-resistant and permanently bonded, i.e. the glas will break before the seal can be broken.

The adhesive composition is preferably made so as to have substantially the same index of refraction, when cured as the glass. It is difficult to detect any sealing material with the naked eye between the handle end and the container surface.

When colored transparent glass is to be bonded together, the adhesive composition may have a colorant added thereto so that the seal between the glass container and the glass handle has the same color as the glass, and it becomes extremely difficult to notice the separate adhesive layer between the affixed portions.

Once the handles or stems have been affixed by the adhesive composition of the invention and the adhesive cured by being subjected to the infra-red heat for two minutes, the glasses may be picked up from the jigs since the handles are now securely held in place. Upon permitting the container to cool for a period of three or four minutes, the container may then be packed for shipment to the customer.

While the invention has been discussed in terms of sealing transparent glass surfaces together, it is to be understood that the adhesive composition of the invention may be used to seal ceramic surfaces, such as handles onto coffee cups, and may be used for sealing other siliceous surfaces.

Having fully described the invention, what is claimed is:

1. A method of permanently adhering two transparent glass surfaces together with a transparent seal which retains its adhesive strength after a plurality of washings in an aqueous medium comprising applying to at least one of said surfaces a solvent-free adhesive composition consisting essentially of a liquid epoxy resin, a curing agent for said resin and a silane having the formula

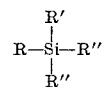

wherein R is an amino-substituted alkyl, R' is a member selected from the group consisting of alkyl, amino-substituted alkyl, and alkoxy, and R'' is an alkoxy group, placing the other glass surface in contact with the coated glass surface and curing said adhesive composition to securely bond said glass surfaces together, said silane being present in an amount sufficient to render said cured composition resistant to attack by moisture.

2. The method as defined in claim 1 wherein said silane is gamma-aminopropyltriethoxy silane.

3. The method as defined in claim 1 wherein said silane is delta-aminobutylmethyl diethoxy silane.

4. The method as defined in claim 1 wherein said silane is present in an amount of from about 1 to about 2.5% by weight of said epoxy resin.

5. A method of permanently securing a transparent glass handle onto the exterior surface of a transparent glass container with a transparent seal which retains its adhesive strength after a plurality of washings in an aqueous medium comprising applying to the exterior surface of said container, a solvent-free adhesive composition consisting essentially of a liquid epoxy resin, a curing agent for said resin and a silane having the formula

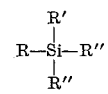

wherein R is an amino-substituted alkyl, R' is a member selected from the group consisting of alkyl, amino-substituted alkyl, and alkoxy, and R'' is an alkoxy group, holding an end surface of said handle in contact with said composition on said glass container and curing said epoxy resin while maintaining said contact to permanently secure said handle to said container surface, said silane being present in an amount sufficient to render said cured composition resistant to attack by moisture.

6. The method as defined in claim 5 wherein said silane is gamma-aminopropyltriethoxy silane.

7. The method as defined in claim 5 wherein said silane is delta-aminobutylmethyldiethoxy silane.

8. The method as defined in claim 5 wherein said silane is present in an amount of from about 1 to about 2.5% by weight of said epoxy resin.

9. A transparent glass container having a transparent glass member permanently secured to the outer surface thereof by means of a transparent, water-resistant, bubble-free, cured resin seal located between the outer surface of said container and the adjacent end surface of said handle, said transparent resin seal, prior to curing consisting of a solvent free mixture of a liquid epoxy resin, a curing agent for said epoxy resin and a silane having the formula

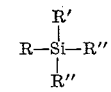

wherein R is an amino substituted alkyl, R' is a member selected from the group consisting of alkyl, amino-substituted alkyl and alkoxy, and R'' is an alkoxy group, said silane being present in an amount sufficient to render said cured resin seal resistant to attack by moisture.

10. The transparent glass container as defined in claim 9 wherein said silane is gamma-aminopropyltriethoxy silane.

11. The transparent glass container as defined in claim 9 wherein said silane is delta-aminobutyl methyldiethoxy silane.

12. The transparent glass container as defined in claim 9 wherein said silane is present in an amount of from about 1 to about 2.5% by weight of said epoxy resin.

13. A method of permanently adhering two siliceous surfaces together with an epoxy resin adhesive and rendering the adhering surfaces impervious to moisture which would ordinarily tend to weaken the bond effected by said adhesive, said adhesive forming a transparent seal which retains its adhesive strength after a plurality of washings in an aqueous medium, comprising applying to at least one of said surfaces a solvent-free adhesive composition consisting essentially of a liquid epoxy resin, a curing agent for said resin and a silane having the formula

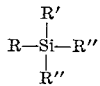

wherein R is an amino-substituted alkyl, R' is a member selected from the group consisting of alkyl, amino-substituted alkyl and alkoxy, and R" is an alkoxy group, placing the other siliceous surface in contact with the coated siliceous surface, and curing said adhesive composition to securely bond said siliceous surfaces together, said silane being present in an amount sufficient to render said cured composition resistant to attack by moisture.

14. The method as defined in claim 13 wherein said siliceous surfaces are ceramic surfaces.

15. A solvent-free adhesive composition suitable for sealing glass surfaces and forming a cured seal therebetween which is resistant to attack or weakening by moisture, said seal retaining its adhesive strength after a plurality of washings in an aqueous medium, said composition consisting essentially of a liquid epoxy resin, a curing agent for said resin and from about 1 to about 2.5% of a silane of the formula

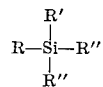

wherein R is an amino-substituted alkyl, R' is a member selected from the group consisting of alkyl, amino-substituted alkyl and alkoxy, and R" is an alkoxy group.

16. The adhesive composition in claim 15 wherein said silane is a member of the group consisting of gamma-aminopropyltriethoxy silane and delta-aminobutyl methyldiethoxy silane.

References Cited by the Examiner

UNITED STATES PATENTS

| | | | |
|---|---|---|---|
| 2,785,085 | 3/1957 | Sayre | 161—185 X |
| 2,819,245 | 1/1958 | Shorr. | |
| 2,843,560 | 7/1958 | Mika | 117—126 |
| 2,931,739 | 4/1960 | Marzocchi et al. | 117—126 |
| 2,974,062 | 3/1961 | Collier | 117—126 |
| 3,075,870 | 1/1963 | Hedler et al. | |
| 3,150,116 | 9/1964 | Masters | 260—824 X |
| 3,166,527 | 1/1965 | Ender | 260—824 X |
| 3,211,684 | 10/1965 | Eakins | 161—193 X |

FOREIGN PATENTS

| | | |
|---|---|---|
| 133,819 | 7/1946 | Australia. |

EARL M. BERGERT, *Primary Examiner.*

ALEXANDER WYMAN, *Examiner.*

W. B. WALKER, HAROLD ANSHER,
*Assistant Examiners.*